United States Patent
Boddu et al.

(10) Patent No.: US 8,007,748 B2
(45) Date of Patent: Aug. 30, 2011

(54) METHOD OF TREATING FLUID CONTAINING VAPOR PHASE METALS, VAPOR PHASE METAL COMPOUNDS, OR BOTH

(75) Inventors: Veera M. Boddu, Champaign, IL (US); Tushar K. Ghosh, Columbia, MO (US); Kent James Hay, Mahomet, IL (US); Dabir S. Viswanath, Columbia, MO (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 332 days.

(21) Appl. No.: 12/401,050

(22) Filed: Mar. 10, 2009

(65) Prior Publication Data
US 2009/0165649 A1    Jul. 2, 2009

(51) Int. Cl.
*B01D 47/00*    (2006.01)
(52) U.S. Cl. .......... 423/210; 423/212; 588/407
(58) Field of Classification Search .......... 588/404, 588/407, 412, 313, 315; 423/210, 212; 252/378 P
See application file for complete search history.

(56) References Cited

U.S. PATENT DOCUMENTS

| | | | |
|---|---|---|---|
| 5,502,021 A * | 3/1996 | Schuster | 502/400 |
| 6,403,044 B1 * | 6/2002 | Litz et al. | 588/313 |
| 6,464,770 B1 | 10/2002 | Palm et al. | |
| 6,694,899 B2 | 2/2004 | Kukin et al. | |
| 6,712,898 B2 | 3/2004 | Palm et al. | |
| 6,712,974 B1 | 3/2004 | Palm et al. | |
| 6,878,669 B2 | 4/2005 | Gislason et al. | |
| 2004/0099184 A1 | 5/2004 | Palm et al. | |
| 2005/0115407 A1 | 6/2005 | Boddu et al. | |

\* cited by examiner

*Primary Examiner* — Edward Johnson
(74) *Attorney, Agent, or Firm* — Earl H. Baugher, Jr.

(57) ABSTRACT

Perlite, particularly, perlite in powdered form, is employed to adsorb metals and metal compounds from fluids, in particular gases at elevated temperature. Treatment of perlite by boiling with sulfuric acid or suspending in a suspension of sulfur in carbon disulfide has been shown to significantly expand the surface area of perlite, thus increasing the efficiency of the process. In select embodiments, powdered perlite is treated to expand its surface area and injected into a fluid stream, such as flue gas, held for a specific retention period, and removed for subsequent disposal. In other embodiments powdered perlite is provided in an adsorption bed. Fluids containing metals or metal compounds in vapor form are permitted to pass through the adsorption bed until the expanded perlite powder is saturated (exhausted) with the metal and metal compounds adsorbed thereon. The perlite is then replaced, disposing of the exhausted perlite.

20 Claims, 2 Drawing Sheets

METHOD OF TREATING FLUID CONTAINING VAPOR PHASE METALS, VAPOR PHASE METAL COMPOUNDS, OR BOTH

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. Developmental work was conducted under the task orders DACA42-01-T-0109 and DACA42-02-P-0088 in a contract titled "Preliminary Investigation of Removal of Lead and Mercury Vapor Using Perlite or Modified Chitosan Coated Perlite Powder." The contract was between the Nuclear Science and Engineering Institute, University of Missouri-Columbia, Mo. 65211 and the U.S. Army Engineering Research and Development Center, Construction Engineering Research Laboratory, Champaign, Ill. This patent and related ones are available for licensing. Contact Bea Shahin at 217 373-7234.

RELATED APPLICATIONS

This application claims the benefit of prior co-pending U.S. Provisional Patent Application Ser. No. 60/525,843, Perlite Sorbents for Vapor Phase Metals and Metal Compounds, by Hay et al., filed Dec. 1, 2003, and is related to U.S. Pat. No. 7,524,494 B2, Method for Surface Treating Perlite Sorbents for Improved Adsorbing of Vapor Phase Metals and Metal Compounds at Elevated Temperatures, issued Apr. 28, 2009, both incorporated herein by reference.

BACKGROUND

The amount of heavy metals contained in flue gases released from high temperature incinerators, such as demilitarization furnaces operated by the U.S. Government and its contractors, is monitored and controlled in accordance with EPA regulations. A typical air pollution control technique is to inject activated carbon or its modified form (activated carbon impregnated with various chemicals) as sorbents into the flue gas or the combustion chamber to capture the metal vapors. The carbon is then separated from the flue gas in a downstream filter system. Chen, S., Rostam-Abadi, M., and R. Chang. *An Evaluation of Carbon-Based Processes for Combined Hg/SO$_2$/No$_x$ Removal from Coal Combustion Flue Gasses*, Book of Abstracts, 216$^{th}$ ACS National Meeting, Boston, Aug. 23-27, 1998.

As an example, the U.S. Army operates and maintains deactivation furnaces for conventional and chemical munitions demilitarization operations. These furnaces are subject to the Hazardous Waste Combustor (HWC) National Emission Standards for Hazardous Air Pollutants (NESHAP). The HWC NESHAP has stringent standards for lead and mercury emissions among various other volatile and semi-volatile metals and toxic organic compounds. Existing incinerators are currently not to exceed 240 micrograms/dry standard cubic meter (μg/dscm) for lead and cadmium emissions. The current compliance standard is set at 24 μg/dscm for new incinerators. These metal emissions exist as vapors near the furnace and afterburner in the air handling system. Thus a desired technology is one that adsorbs these metals while they exist as vapors at the high temperature locations in the air handling system before they condense to form sub-micron particulates that are extremely difficult to capture by conventional filtration systems. Existing adsorbent technologies are not effective at high temperatures and even if they could be made more effective they would be too costly to employ in this application.

A number of studies exist on the removal of lead vapor from a gas stream. Yang et al. (2001) reported a method of reducing volatile lead emissions from waste incineration by high temperature capture of vapor phase metals before they condense into fine particles. Packed bed sorption experiments with calcinated kaolin at 973-1173° C. were conducted. Lead reacts with the sorbent to form water insoluble lead-mineral complexes. Increased bed temperature resulted in increased capture rates, but it had no effect on maximum uptake. Diffusional resistance developed in the interior of the porous kaolin particles. This resistance became limiting only after the conversion of lead-kaolin reached a value greater than 50%. Yang, H., Yun, J., Kang, M., Kim, J., and Y. Kang; *Mechanism and Kinetics of Cadmium and Lead Capture by Calcined Kaoline at High Temperatures*; Korean J. Chem. Eng., 18(4), 499-505, 2001.

Vapors of lead chloride were removed by adsorption on a bed of $Al_2O_3$ at 570-650° C. The concentration of lead was measured during the adsorption process by low-energy radiation. The rate of adsorption increased with the flow rate. The amount adsorbed at saturation depended on the internal surface area of the adsorbent as well as on the particle size. Aharoni, C., Neuman, M., and A. Notea; Ind. Eng. Chem., Process Des. Dev. 14(4), 417-421, 1975.

Wronkowski (1965) reported adsorption of tetraethyl lead on two kinds of activated carbons at 18° C. with partial pressure in the range 0.03-0.9 atmospheres. The amount adsorbed depended on the specific surface of the given carbon and on the structure of its pores. Wronkowski, C., *Adsorption of Tetraethyl Lead Vapors on Activated Carbon*, Gaz. Woda Tech. Sanit., 39(4), 131-132, 1965.

Uberoi and Shadman (1990) evaluated several sorbents for removal of lead compounds, mainly $PbCl_2$. The sorbents were silica, alpha-alumina, and natural kaolinite, bauxite, emathlite, and lime. The experiments were carried out at 700° C. At this temperature $PbCl_2$ chemically reacted with the sorbent producing both water soluble and insoluble compounds. The authors provided relative sorption capacity, with kaoline giving the best result. Uberoi, M. and M. Shadman; *High-Temperature Adsorption of Lead Compounds on Solid Sorbents*; AIChE J., 36, 307, 1990.

Wey and his coworkers studied the adsorption mechanisms of heavy metals, including lead, on silica sands using a fluidized bed system at the temperature range of 600 to 800° C. Within this temperature range chemical reactions rather than a physical adsorption are preferred. They noted that for lead, both chemical and physical adsorption mechanisms are all-important depending on the reacting environment. Saturation adsorption capacities of silica sand for lead were 16.08 mg/g at 600° C. and 12 mg/g at 800° C. Chen, X., Feng, X., Liu, J., Fryxell, G. E., and M. Gong. *Mercury Separation and Immobilization Using Self-Assembled Monolayers on Mesoporous Supports (SAMMS)*, Sep. Sci. Technol., 34(6&7), 1121-1132, 1999. Wey, M.-Y., Hwang, J.-H., and J.-C. Chen; *The Behavior of Heavy Metal Cr, Pb, and Cd During Waste Incineration in Fluidized Bed Under Various Chlorine Additives*; J. of Chem. Eng. of Japan, 29(3), 494-500, 1996.

DETAILED DESCRIPTION

Figure 1:
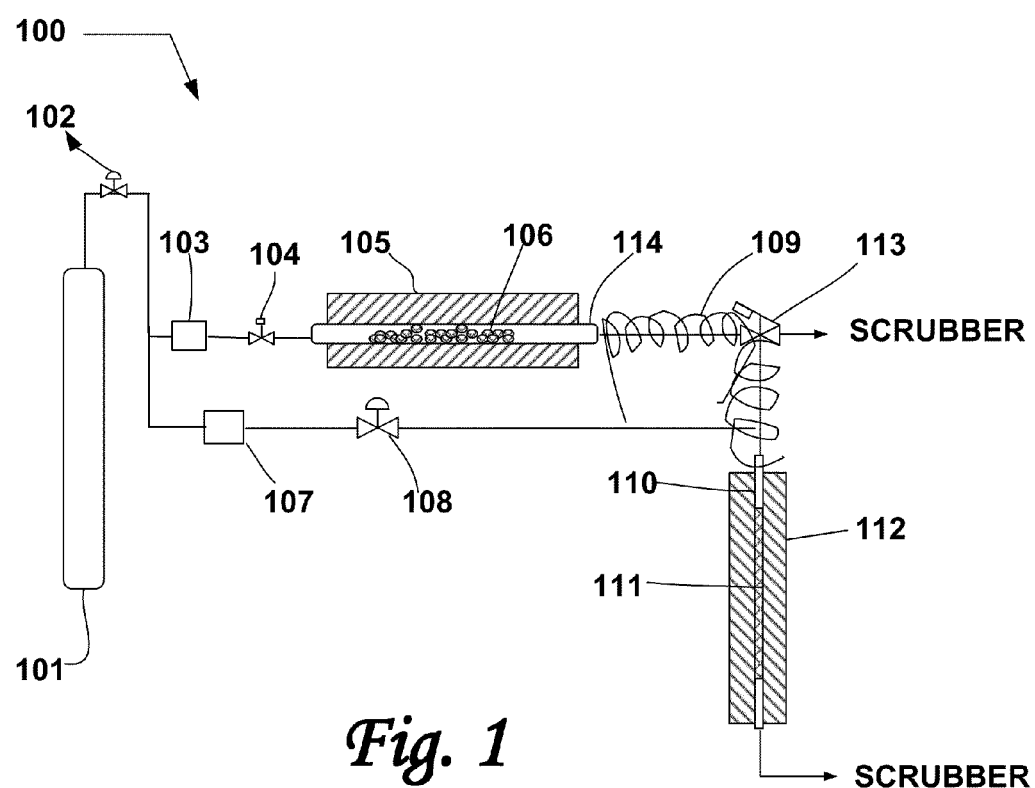
FIG. 1 is a schematic diagram of an experimental system used in determining the efficacy of an embodiment of the present invention.

An embodiment of the present invention provides a process of adsorbing metals in a vapor state using perlite, surface-modified perlites, or both. These metals may be contained in high temperature flue gases, for example. A further embodiment of the present invention encompasses the perlite or surface-modified perlite used as the sorbent. As a sorbent, it may be injected into the fluid containing the metal in vapor form, such as a flue gas, placed in a fixed bed through which the metal in vapor form passes, or both. Surface-modified perlites may be used as high-temperature sorbents but are not limited to that application.

Perlite is an aluminosilicate material derived from volcanic rocks. It is a very light and relatively porous material. Tables 1 and 2 show the physical properties and chemical analysis of perlite respectively. The tables are provided by Silbrico Corporation, www.silbrico.com.

TABLE 1

Typical physical properties of perlite used as the substrate.

| Physical Properties | Values |
| --- | --- |
| Softening point | 1600° F.-2000° F. |
| Fusion point | 2300° F.-2450° F. |
| pH | 6.6-8.0 |
| Specific Heat | 0.20 cal/g ° C. |
| Specific Gravity | 2.2 to 2.4 |
| Refractive Index | 1.5 |
| % Free Moisture, Max. | <0.5 |

TABLE 2

Table 2a. Typical chemical analysis of perlite (major component).

| Compounds | (%) |
| --- | --- |
| Silicon | 33.8 |
| Aluminum | 7.2 |
| Potassium | 3.5 |
| Sodium | 3.4 |
| Iron | 0.6 |
| Calcium | 0.6 |
| Magnesium | 0.2 |
| Traces | 0.2 |
| Oxygen (by difference) | 47.5 |
| Net Total | 97.0 |
| Bound Water | 3.0 |
| Total | 100.0 |

Table 2b. Typical chemical analysis of perlite, analysis of trace elements.

| Trace Elements | Percent |
| --- | --- |
| Arsenic | <0.001** |
| Barium | <0.1 |
| Boron | <0.01 |
| Chlorine | <0.0005 |
| Chromium | <0.0075 |
| Copper | <0.0015 |
| Gallium | <0.05 |
| Lead | <0.001** |
| Manganese | <0.3 |

TABLE 2-continued

| Molybdenum | <0.002 |
| --- | --- |
| Nickel | <0.002 |
| Sulfur | <0.2 |
| Titanium | <0.1 |
| Zirconium | <0.003 |

**By Food ChemicalsCodex Method

Perlite is an aluminosilicate material derived from volcanic sands, thus it is readily available and very inexpensive. Adsorption capacity of perlite for lead vapors, particularly when using sulfuric-acid treated perlite, is very high in comparison to conventional sorbents employed at similar temperatures. The stability and surface characteristics of perlite make it extremely well suited for high temperature applications. The resultant "contaminated sorbent" can be easily vitrified or encapsulated and safely disposed.

Perlite and modified perlites are capable of adsorbing metal in a vapor or gaseous phase. The surface area of unmodified perlite is relatively low leading to a physical limitation on the amount of metal it may adsorb. Perlite may be activated by using strong alkalies and strong acids, either alone or in one or more series combinations. Steam activation may be used in batch treatment using high pressure-high temperature steam. Thus, coating the surface of perlite with appropriate chemicals enhances the adsorption capacity of perlite. Because of its physicochemical stability above 1000° F. and its lightweight, perlite is suitable for sorbent injection-type control technology near the entrance to the flue stack of furnaces.

Steam activation, using a Parr Autoclave (Parr Instrument Co., 211 53$^{rd}$ St., Moline, Ill. 61265) or similar apparatus may be employed in a batch mode using high temperature-high pressure steam. Perlite may be activated using KOH, $Na_2CO_3$, HCl, $H_2SO_4$, and $HNO_3$, and a combination of acid followed by alkali treatment. The activated perlite may be treated with sulfur and sulfur in $CS_2$. Approximately 20% by mass of elemental sulfur, and 0.1 M solution of sulfur in $CS_2$ may be used.

The adsorption capacity of pure perlite and some surface-modified perlites for lead vapors in argon has been evaluated at 100, 200 and 350° C. Generally, 3.0 M solutions are used to treat the perlite.

Perlite was treated with the following chemicals for testing: sulfur, hydrochloric acid, nitric acid, and sodium hydroxide. Various sources of sulfur were used, including sulfuric acid, direct sulfur impregnation, and impregnation with sulfur dissolved in carbon disulfide. Various treatments for modifying perlite were investigated.

HCl treated perlite: 50 grams of expanded perlite was boiled with 500 ml of 3.0 M HCl for about two hours at 100-110° C. After cooling, the mixture was filtered and washed with distilled water until the filtrate was free from chloride ions. The product was then dried in an oven at 110° C.

NaOH treated perlite: 25 grams of expanded perlite was boiled with 250 ml of 3.0 M NaOH solution at 100-110° C. for two hours. After cooling, the pH of the suspension was adjusted to 2.0 by adding 1:1 (v/v) HCl with stirring. The suspension was allowed to stand for 24 hours and then it was filtered and washed with distilled water until the filtrate gave a negative test for chloride ions. It was then dried in an oven at 110° C.

HCl and NaOH treated perlite: 25 grams of HCl treated perlite was suspended in 250 ml of 3.0 M NaOH solution and boiled at 100-110° C. for two hours. The pH of the suspension was adjusted by adding 1:1 (v/v) HCl with stirring. The suspension was allowed to stand for 24 hours. The suspension was filtered and washed with distilled water until the filtrate showed the absence of chloride ions. It was then dried in an oven at 110° C.

$HNO_3$ treated perlite: 25 grams of expanded perlite was boiled with 250 ml of 3.0 M $HNO_3$ for about two hours at 100-110° C. After cooling, the mixture was filtered and washed with distilled water until the filtrate was neutralized. The product was then dried in an oven at 110° C.

$H_2SO_4$ treated perlite: 25 grams of expanded perlite was suspended in 250 ml of 2.0 M $H_2SO_4$ and boiled for about two hours at 100-110° C. The product was filtered, washed with distilled water until the filtrate was neutralized, and dried in an oven at 110° C.

Elemental sulfur impregnated perlite: 20 grams of perlite was mixed with 5 grams of elemental sulfur and heated to about 400-500° C. in a furnace under an argon atmosphere for about 15 minutes.

$Cs_2$+sulfur-impregnated perlite: 25 grams of perlite was suspended in 250 ml of 0.125 M solution of sulfur in $CS_2$ for 24 hours. The $CS_2$ was evaporated at room temperature by passing argon gas through the suspension and the resultant product was dried in an oven at 110° C.

In one embodiment of the present invention, a surface-modified perlite sorbent may be prepared as follows: About 25 grams of expanded perlite is suspended in 250 ml of two-molar sulfuric acid (2.0 M $H_2SO_4$) and boiled for about two hours at 100-110° C. The resultant modified perlite is then filtered, washed with distilled water until the filtrate is neutralized, and dried in an oven at 110° C.

Refer to FIG. 1, depicting the schematic diagram of a dynamic adsorption apparatus 100 used to determine the metal vapor adsorption capacity of perlite, modified perlite, and conventional sorbents, such as activated carbon (charcoal).

Lead vapor in the concentration level of a few $\mu g/m^3$ was obtained by using a first furnace 105 to heat a small amount of pure lead metal granules 106 in a stainless steel container 114. Air/argon from a gas bottle 101 was released from the bottle 101 by a first valve 102 and controlled via a first flow controller 103 before flowing to a second valve 104 at the entrance of the container 114. By flowing the gas through the container 114, lead vapor (not shown separately) from the heated lead granules 106 is swept out the other side of the container 114 into insulated tubing 109 that is provided with a three-way switching 113 for either collecting the vapor product, e.g., in a scrubber, or sending it to a tube 110 that serves as an adsorption bed for a sorbent of interest 111, from whence the "cleaned" vapor may be sent to a scrubber. Air/argon or other suitable gas may also be provided from the first valve 102 to a second flow controller 107 and second valve 108 for direct injection into the tube 110, depending on the need for maintaining a pre-specified temperature, flow regime, or conditioning the sorbent 111. A second furnace 112 is used to maintain a pre-specified temperature in the adsorption bed (tube) 110. Because vapor pressure is a function of temperature, the temperature and gas flow rate determines the concentration of lead vapor in the final gas stream, thus this dynamic adsorption apparatus 100 is fitted with means to adjust both gas stream flow and temperature.

An adsorption bed constructed of a 2.54 cm (1-in.) I.D. stainless steel tube 110 was used. A pre-specified amount of sorbent 111, such as perlite or modified perlite, was placed between two layers of glass wool (not shown separately). The lower layer of glass wool supports the sorbent 111 while the upper layer prevents the carry-over of sorbents 111 from the adsorption bed (tube) 110. The outside surface of the tube 110 and the tubing 109 were wrapped uniformly with a heating tape and three layers of insulating tape (not shown separately) to reduce heat loss. The temperature of the tube 110 was controlled. Prior to each run, the sorbent 111 in the tube 110 was regenerated at 473.15 K for 12 hours with a dry air flow rate of 250 $cm^3$/min to remove moisture and other pollutants that might have been adsorbed on the sorbent 111 before it was placed in the tube 110. Following regeneration, the tube 110 was adjusted to the desired adsorption temperature. The flow rate was controlled using a mass flow controller 103, 107. Air/nitrogen was first passed through the vapor generation system 105, 114. After about one hour, the flow was diverted towards the tube 110 using the three-way switching valve 113. After a pre-specified time, the adsorption run was stopped and a sample of the "contaminated adsorbent" was collected for analysis using the Energy Dispersive X-ray Fluorescence (EDXRF) method.

Figure 2:
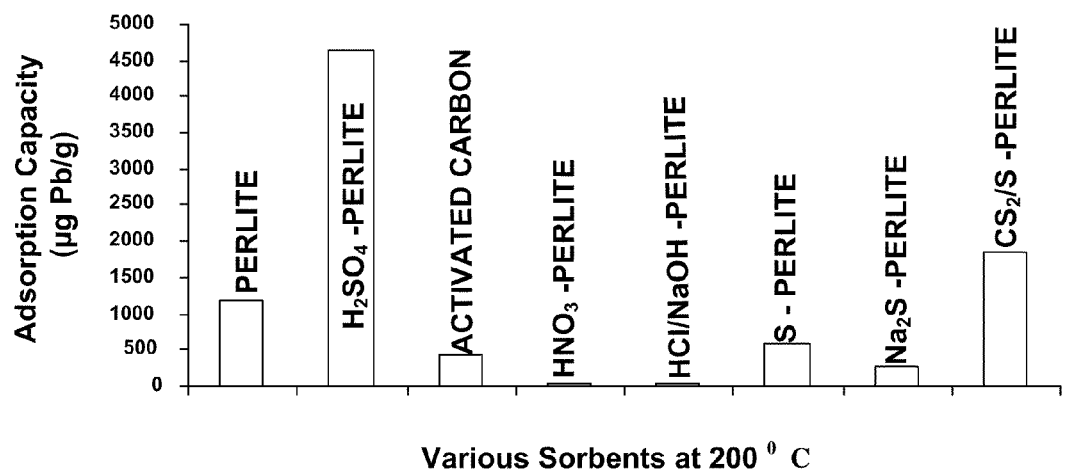
FIG. 2 summarizes results of the evaluation of the sorption capacity of the perlite and surface-modified perlite of an embodiment of the present invention.

Refer to FIG. 2 for results of the evaluation of the sorption capacity at 200° C. of perlite, $H_2SO_4$-perlite, activated carbon, $HNO_3$-perlite, HCl/NaOH-perlite, S-perlite, $Na_2$S-perlite, and $CS_2$/S-perlite. Untreated perlite removed lead in the range of 1000 to 1706 µg Pb/g of perlite at 350° C. Sulfur-treated perlite samples showed higher capacity for removal than other treated samples. Among the sulfur-treated samples, the sample that was treated with sulfuric acid showed highest capacity for lead sorption, yielding from about 2000-4700 µg Pb/g of perlite with a maximum of 4634 µg Pb/g of perlite at 200° C. It is likely that lead is both chemically and physically bound to the sulfuric acid-treated perlite.

Figure 3:
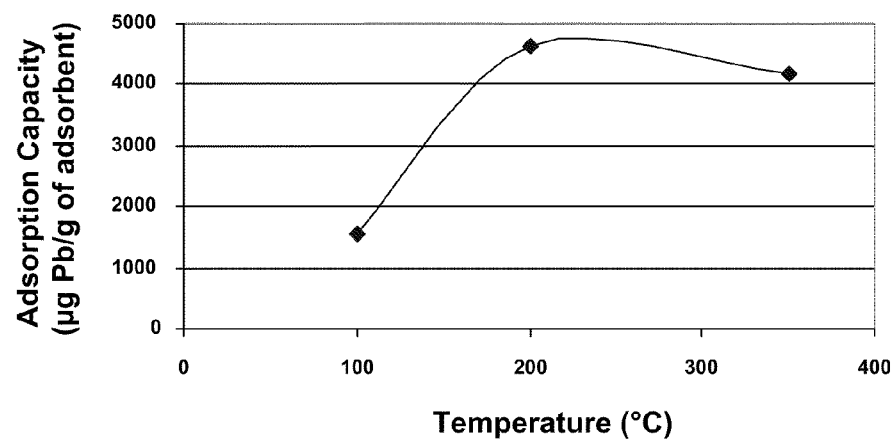
FIG. 3 depicts the effect of temperature on lead capture capacity of sulfuric acid treated perlite.

Refer to FIG. 3, showing that capacity for sorption of lead onto the sulfuric acid-treated perlite increased with increasing temperature up to about 220° C.

While the invention has been described in terms of its preferred embodiments, those skilled in the art will recognize that the invention may be practiced with modifications within the spirit and scope of the claims. For example, an embodiment of the present invention has potential applications for treating gaseous emissions from burning fossil fuels as well as industrial emissions containing heavy metals such as lead, cadmium, arsenic, and mercury. An embodiment of the present invention may be injected into the emissions stream and, once embedded with heavy metals, collected downstream in existing bag-houses or in particulate filter collection systems. An embodiment of the present invention may also be used for treating wastewater from metal plating facilities and ground water contaminated with chromium and other metals. Thus, it is intended that all matter contained in the foregoing description or shown in the accompanying drawings shall be interpreted as illustrative rather than limiting, and the invention should be defined only in accordance with the claims and their equivalents.

The abstract is provided to comply with the rules requiring an abstract, which will allow a searcher to quickly ascertain the subject matter of the technical disclosure of any patent issued from this disclosure. 37 CFR §1.72(b). Any advantages and benefits described may not apply to all embodiments of the invention.

We claim:
1. A method of treating a fluid flow containing vapor phase metals, vapor phase metal compounds, or both, comprising:
   injecting powdered perlite having an expanded surface area into said fluid flow;
   retaining said perlite in said fluid flow for a pre-specified retention period, wherein said perlite adsorbs at least some said vapor phase metals and metal compounds;
    capturing said metals and metal compounds as vapors on said perlite before said metals and said metal compounds condense to form particulates;
    collecting said perlite after said pre-specified retention period; and
    disposing of said collected perlite,
wherein said method enables removing at least some said vapor phase metals and metal compounds from said fluid flow.

2. The method of claim 1, said fluid comprising flue gas.

3. The method of claim 1, employing said powdered perlite as modified perlite treated to have an expanded surface area.

4. The method of claim 3, employing said powdered perlite that has been modified to have an expanded surface area by treating with at least sulfuric acid.

5. The method of claim 3, maintaining said fluid flow within a pre-specified temperature range.

6. The method of claim 5 maintaining said pre-specified temperature range at about 200° C. to about 220° C.

7. A method of treating a fluid flow containing vapor phase metals, vapor phase metal compounds, or both, comprising:
    passing said fluid flow through an adsorption bed of at least powdered perlite;
    retaining said fluid flow in said adsorption bed for a pre-specified retention period;
    capturing said metals and metal compounds as vapors before said metals and said metal compounds condense to form particulates;
wherein said perlite adsorbs at least some said vapor phase metals and metal compounds;
    replacing said perlite upon exhaustion; and
    recycling said exhausted perlite,
wherein said method enables removing at least some said vapor phase metals and metal compounds from said fluid flow.

8. The method of claim 7 in which said fluid comprises flue gas.

9. The method of claim 7, employing said perlite as modified perlite treated to have a pre-specified expanded surface area.

10. The method of claim 9, establishing said pre-specified retention period as that period at which said expanded surface area is unable to adsorb additional said vapor phase metals and metal compounds at a pre-specified rate.

11. The method of claim 9, employing said perlite with an expanded surface area that has been modified by treating with at least sulfuric acid.

12. The method of claim 9, employing said perlite with a pre-specified expanded surface area within a pre-specified temperature range.

13. The method of claim 12 maintaining said temperature range at about 200° C. to about 220° C.

14. A method of treating a fluid containing vapor phase metals, vapor phase metal compounds, or both, comprising:
    passing said fluid through an adsorption bed of at least powdered perlite;
    retaining said fluid in said adsorption bed for a pre-specified retention period,
wherein said perlite adsorbs at least some said vapor phase metals and metal compounds;
    capturing said metals and metal compounds as vapors on said perlite before said metals and said metal compounds condense to form particulates;
    replacing said perlite upon exhaustion; and
    recycling said exhausted perlite,
wherein said method enables removing at least some said vapor phase metals and metal compounds from said fluid.

15. The method of claim 14 in which said fluid comprises at least in part a gas.

16. The method of claim 14, employing said powdered perlite as modified perlite treated to have a pre-specified expanded surface area.

17. The method of claim 16, employing said modified perlite with an expanded surface area, said surface area modified by treating with at least sulfuric acid.

18. The method of claim 16, establishing said pre-specified retention period as that period at which said expanded surface area is unable to adsorb additional said vapor phase metals and metal compounds at a pre-specified rate.

19. The method of claim of claim 16, employing said perlite with an expanded surface area within a pre-specified temperature range.

20. The method of claim 19, establishing said pre-specified temperature range between about 200° C. and about 220° C.

\* \* \* \* \*